US012493369B1

(12) United States Patent
Tan et al.

(10) Patent No.: US 12,493,369 B1
(45) Date of Patent: Dec. 9, 2025

(54) HUMAN INTERFACE DEVICE SENSING

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/788,439

(22) Filed: Jul. 30, 2024

(51) Int. Cl.
*G09G 5/00* (2006.01)
*G06F 3/01* (2006.01)
*G06F 3/038* (2013.01)

(52) U.S. Cl.
CPC .............. *G06F 3/038* (2013.01); *G06F 3/011* (2013.01)

(58) Field of Classification Search
CPC ...... G06F 3/011; G06F 3/03545; G06F 3/038; G06F 3/046
See application file for complete search history.

(56) References Cited

U.S. PATENT DOCUMENTS

| | | |
|---|---|---|
| 6,902,332 B2 | 6/2005 | McLoone |
| 8,368,649 B2 | 2/2013 | Hall |
| 8,654,095 B1 | 2/2014 | Cho et al. |
| 9,195,351 B1 * | 11/2015 | Rosenberg ............ G06F 1/1626 |
| 9,285,903 B1 * | 3/2016 | Yun ......................... G09B 5/02 |
| 9,323,356 B2 | 4/2016 | Kuo |
| 9,459,794 B1 * | 10/2016 | Soegiono .............. G06F 3/0486 |
| 9,785,272 B1 * | 10/2017 | Rosenberg ........ G06F 3/041661 |
| 10,331,220 B2 * | 6/2019 | Hautson ................. G06F 3/046 |
| 10,423,245 B2 * | 9/2019 | Keating ............. G06F 3/03545 |
| 10,719,145 B1 | 7/2020 | Files et al. |
| 10,921,914 B2 * | 2/2021 | Hu ...................... G06F 3/04162 |
| 11,809,646 B1 | 11/2023 | Knoppert et al. |
| 11,861,076 B1 * | 1/2024 | Tan ........................... G06F 3/02 |
| 11,874,687 B1 * | 1/2024 | Tan ......................... G06F 3/046 |
| 11,886,700 B1 * | 1/2024 | Lee ..................... G06F 3/04886 |
| 11,923,842 B1 * | 3/2024 | Tan .................... H03K 17/9502 |
| 2005/0083316 A1 | 4/2005 | Brian et al. |
| 2006/0092136 A1 | 5/2006 | Nishimura |
| 2006/0205368 A1 | 9/2006 | Bustamante et al. |
| 2007/0171205 A1 | 7/2007 | Steinberg |
| 2009/0033632 A1 | 2/2009 | Szolyga et al. |
| 2010/0053085 A1 | 3/2010 | Hall |

(Continued)

FOREIGN PATENT DOCUMENTS

WO     2007114631 A2     10/2007

*Primary Examiner* — Joe H Cheng
(74) *Attorney, Agent, or Firm* — WOMBLE BOND DICKINSON (US) LLP

(57) ABSTRACT

Methods and systems for providing computer implemented services using user input are disclosed. To obtain the user input, a passive human interface device may be used. The human interface device may encode information regarding actuations of the human interface device in magnetic field distributions emanating from the human interface device. The magnetic field distribution may be sensed using a sensing device to identify user input provided by a user of the human interface device. The sensing device may be positioned in various locations to identify different types of user input.

20 Claims, 8 Drawing Sheets

(56) References Cited

U.S. PATENT DOCUMENTS

| | | |
|---|---|---|
| 2012/0038496 A1 | 2/2012 | Edwards |
| 2013/0314338 A1 | 11/2013 | Nam et al. |
| 2014/0184505 A1 | 7/2014 | Fullerton et al. |
| 2014/0267150 A1 | 9/2014 | Masashi |
| 2015/0277598 A1 | 10/2015 | Aurongzeb et al. |
| 2016/0041678 A1 | 2/2016 | Wu |
| 2016/0299606 A1 | 10/2016 | Go |
| 2016/0313819 A1 | 10/2016 | Ancona et al. |
| 2018/0314316 A1 | 11/2018 | Xu et al. |
| 2019/0113966 A1 | 4/2019 | Connellan et al. |
| 2019/0187856 A1 | 6/2019 | Bruwer et al. |
| 2019/0339776 A1 | 11/2019 | Rosenberg et al. |
| 2020/0004346 A1 | 1/2020 | Vlasov et al. |
| 2020/0371625 A1 | 11/2020 | Katsurahira et al. |
| 2022/0200337 A1* | 6/2022 | Watanabe ............... G06F 3/046 |
| 2022/0352635 A1 | 11/2022 | Compton |
| 2024/0382272 A1 | 11/2024 | Sprenger |

* cited by examiner

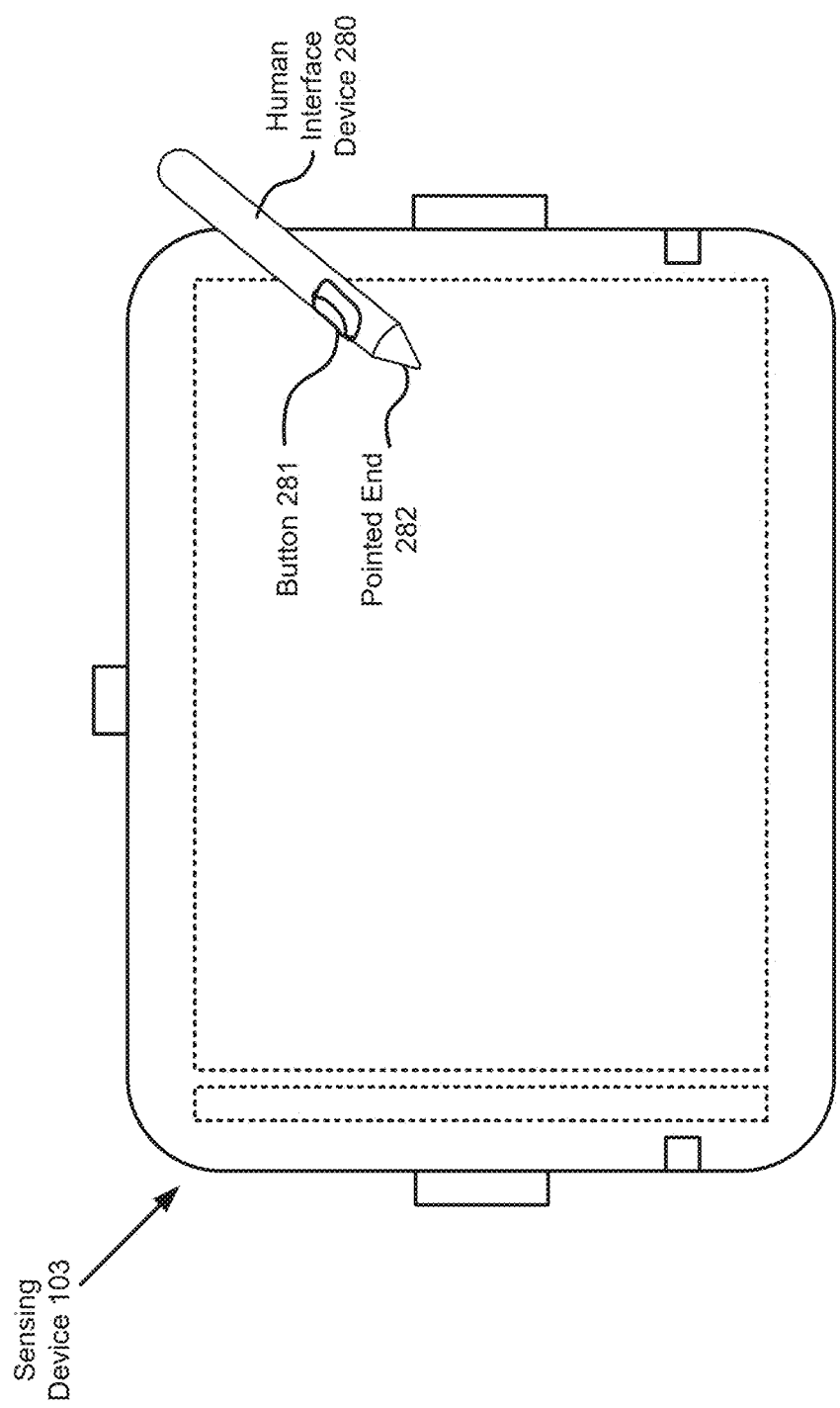

HUMAN INTERFACE DEVICE SENSING

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

FIGS. 2D-2F show diagrams illustrating a sensing device in accordance with an embodiment.

DETAILED DESCRIPTION

Figure 1:
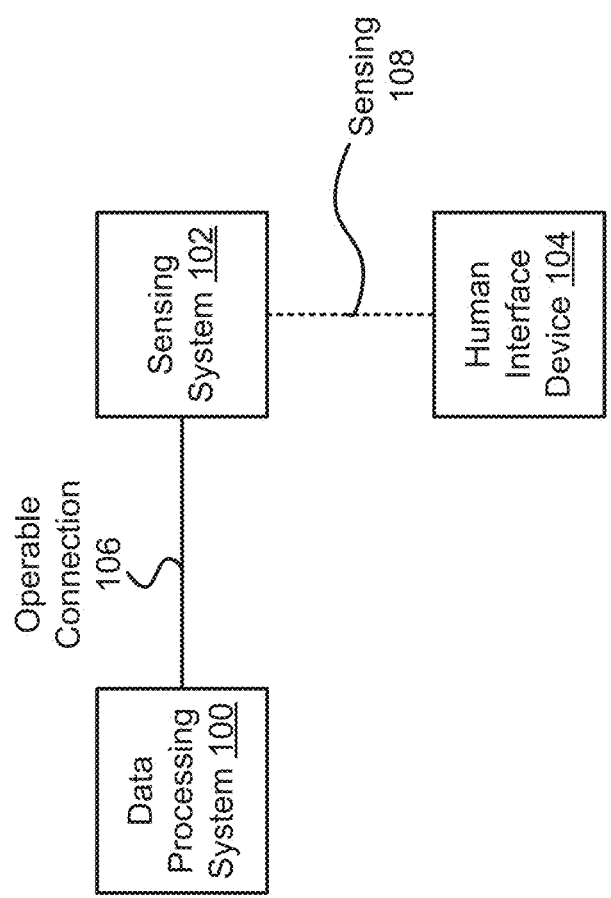
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic field distributions detectable by a sensing system. The sensing system may sense the magnetic field distributions and obtain information reflecting changes in the position and/or orientation of the human interface device. The magnetic field distribution may be generated using permanent magnets of the human interface device. Thus, information reflecting actuations of the human interface device by the user may be encoded in the magnetic field distributions and may be sensed.

The magnetic field distribution may be sensed using a sensing device. The sensing device may be positioned in a variety of locations (e.g., on a table surface, on a rear side of a display, etc.) to obtain user input from different types of human interface devices. For example, the sensing device may be positioned on a table and a mouse type human interface may be positioned on it, while the sensing device may be attached toa rear side of a screen and a stylus type human interface device may be positioned on an opposite side of the screen. In either positioning, samples field distributions may enable actuations of the human interface device to be identified.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining the user input.

In an embodiment, a sensing device for use with a passive human interface device is provided. The sensing device may include a body that includes a top surface adapted for positioning with the passive human interface device; a sensing area adapted to sense a magnetic field distribution generated by and emanating outside of the passive human interface device while the passive human interface device is positioned in each position from a list of positions including: on the top surface, and on a first side of a display while the sensing area is positioned on a second side of the display, the first side being opposite to the second side; and a processing area adapted to generate a control signal based on the magnetic field distribution to convey user input provided by a user of the passive human interface device to a data processing system.

The sensing device may also include at least one sensing element that is: positioned with the sensing area, and adapted to sense a magnitude and/or orientation of the magnetic field distribution at a location of the at least one sensing element.

The sensing device may additionally include a signal processing chain that is: positioned with the processing area; and adapted to: obtain the magnitude and/or orientation of the magnetic field distribution at the location from the at least one sensing element as a first sample of samplings of the magnetic field distribution; and generate the control signal based on at least the magnitude and/or orientation of the magnetic field distribution at the location.

The at least one sensing element may include a first sensing element and a second sensing element, and the control signal is based on the first sample and a second sample of the samplings obtained from the second sensing element.

The sensing device may also include an interface adapted to place the sensing device in operable communication with the data processing system and use the control signal to convey the user input to a data processing system while the data processing system is operably connected to the sensing device via the interface.

The sensing device may additionally include at least one attachment element adapted to reversibly attach the body to another device.

The at least one attachment element may include a first attachment element positioned on a first edge of the body; and a second attachment element positioned on a second edge of the body.

The other device may be a data processing system that includes the display.

The body may have a width that is greater than a width of the display, and the body may have a height that is greater than a height of the display.

The processing area may assume that at least a portion of the magnetic field distribution is due to a permanent magnet embedded in the passive human interface device, and changes in the magnetic field distribution are due to actuations of the human interface device that change a position and/or orientation of the permanent magnet.

In an embodiment, a system is provided. The system may include a sensing device as discussed above, and a human interface device.

In an embodiment, a method of operating a data processing system is provided. The method may include obtaining user input using a human interface device and sensing device, as discussed above.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and provide the signals and/or data to data processing system 100. A user may physically interact with human interface device 104, thereby allowing the signals and/or data provided by sensing system 102 to include information regarding the physical actions of the user.

For example, if a user moves human interface device 104, sensing system 102 may track the change in position and/or motion of human interface device 104 (and/or portions thereof) and provide signals and/or data reflecting the changes in position and/or motion. Similarly, if a user actuates an actuatable portion (e.g., buttons) of human interface device, sensing system 102 may track the actuation of the actuatable portion and provide signals and/or data reflecting the actuation.

To track human interface device 104, sensing system 102 may include one or more sensors that sense a magnetic field distribution emanating from human interface device 104. The sensors may use the sensed magnetic field distribution to track a location (absolute or relative) and orientation (absolute or relative) of one or more magnets embedded in human interface device 104. The sensors may generate the signals and/or data provided by sensing system 102 to data processing system 100. The sensors may sense the magnitude and/or direction of the magnetic field distribution that passes proximate to each sensor (or a portion of). By knowing the relative placements of the sensors with respect to one another, the position and/or orientation of the one or more magnets may be known (e.g., the magnetic field distribution may be treated as emanating from the one or more magnets with known dimensions and/or field strength generation capabilities). Consequently, the position and/or orientation of the one or more magnets may be used to infer forces applied by a user to human interface device 104 which may be interpreted as user input.

Sensing system 102 may also include, for example, analog to digital converters, digital signal processing devices or other signal processing devices, and/or other devices for generating the signals and/or data based on information obtained via the sensors. Refer to FIGS. 2A and 2D-2F for additional details regarding sensing system 102

Human interface device 104 may be implemented with a physical device that a user may actuate in one or more ways. One or more magnetics may be mechanically coupled so that the actuations cause the magnetic field emanating from the magnets to change when a user of human interface device 104 actuates it. Actuating human interface device 104 may change the orientation and/or position of the one or more magnets with respect to the sensors of sensing system 102.

Figure 2A:
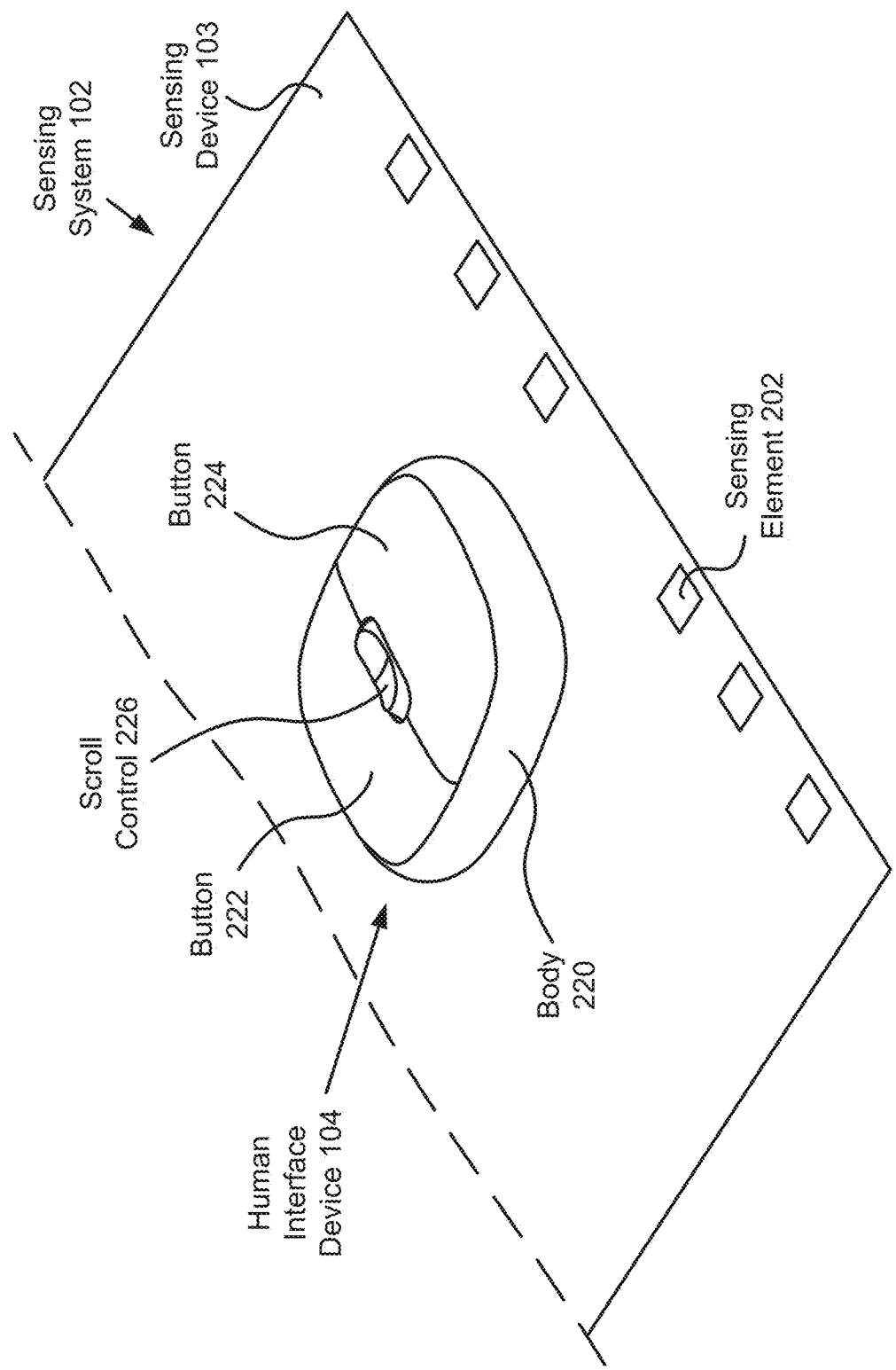
FIG. 2A shows a diagram illustrating a human interface device and a sensing system in accordance with an embodiment.
Figure 2B:
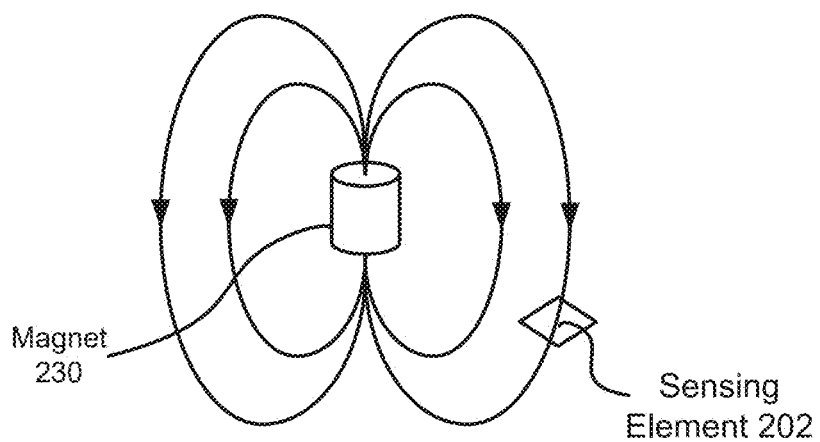
FIGS. 2B-2C show diagrams illustrating field sensing in accordance with an embodiment.
Figure 2C:
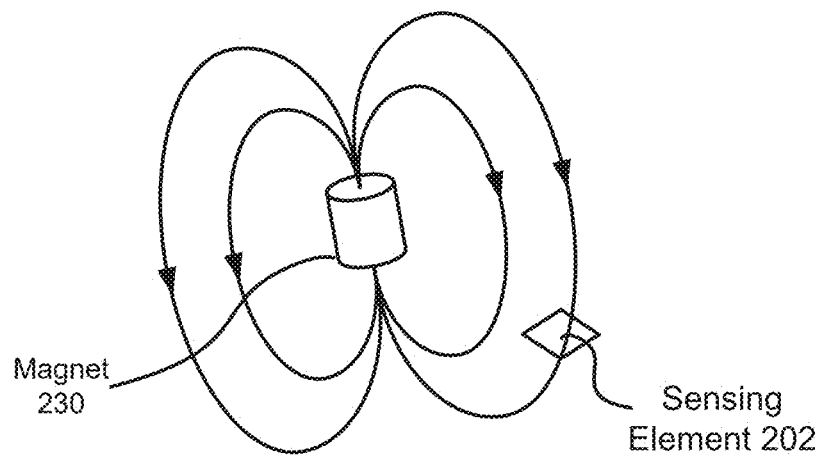

For example, when human interface device 104 is rotated with respect to sensing system 102, the strength and/or orientation of the magnetic field distribution emanating from the one or more magnets as sensed by sensors of sensing system 102 may change. Similarly, when buttons or other actuatable elements of human interface device 104 are actuated, the one or more magnets may be translated (e.g., in one or more planes) thereby changing the strength of the magnetic field distribution sensed by sensors of sensing system 102. Refer to FIGS. 2A-2C for additional details regarding sensing of human interface device 104.

Human interface device 104 may be a passive device. For example, human interface device 104 may not consume power, include batteries, sensors, semiconductor based components/devices (e.g., chips), etc. Consequently, human interface device 104 may be of smaller size, lower weight, and/or may provide other advantages when compared to active devices such as a computer mouse.

Data processing system 100 may perform a lookup or other type of operation to translate the signals and/or data from sensing system 102 into user input. Once obtained, the user input may be used to drive downstream processes (e.g., selections via a graphical user interface, indexing through data, etc.).

Figure 3:
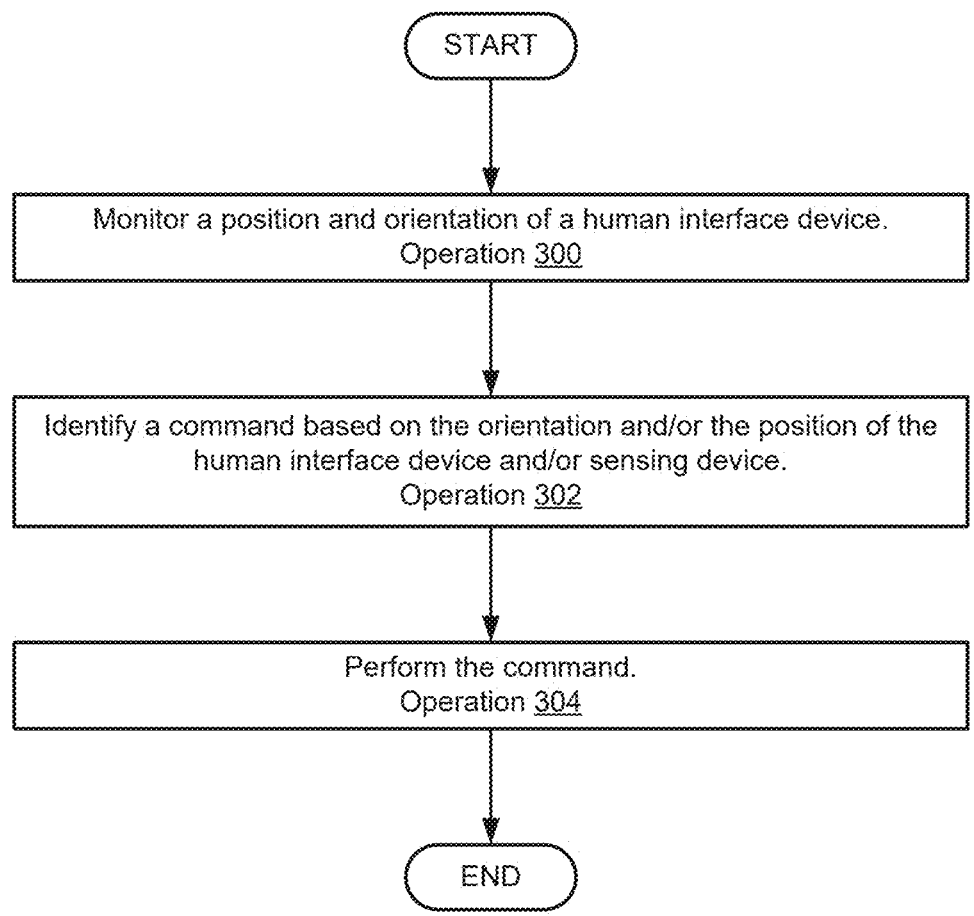
FIG. 3 shows a flow diagram illustrating a method of obtaining user input and providing computer implemented services in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection and/or via networks. However, in some embodiments, human interface device 104 may not be operably connected to other device (e.g., may be a passive device), but may be sensed by sensing system 102 via sensing 108. For example, during sensing 108, a static magnetic field distribution emanating from human interface device 104 and generated by a permanent magnet therein may be sensed by sensing system 102.

While illustrated in FIG. 1 as including a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2C.

Turning to FIG. 2A, an isometric diagram of human interface device 104 and sensing system 102 in accordance with an embodiment is shown. In FIG. 2A, human interface device 104 is illustrated as being a mouse type pointing device. However, human interface device 104 may be other types of devices (e.g., styluses, dials, etc.) through which user input may be obtained without departing from embodiments disclosed herein.

To obtain user input, human interface device 104 may include body 220 in which at least one permanent magnet is positioned. The magnet may be coupled to body 220, buttons (e.g., 222, 224), and scroll control 226 and to which a user may apply force (e.g., may push down on button 222).

When such surfaces receive the force, human interface device 104 may actuate and/or move/rotate which may cause the relative position of the magnets of human interface device 104 to change with respect to sensing system 102. Consequently, the magnetic field emanating outside of body 220 and reaching sensing system 102 may change. In other words, forces applied by a user to human interface device 104 may be encoded in the magnetic field distribution.

To obtain user input, sensing system 102 may include sensing device 103. Sensing device 103 may include any number of sensing elements (e.g., 202). The sensing elements may be sensors that monitor a magnitude and direction of a magnetic field distribution, and generate signals or data to reflect these quantities. While not shown, sensing system 102 may include a signal processing chain (e.g., any number of signal conditioning and processing devices) that may condition and process the signals generated by the sensing elements to obtain information regarding the location and/or orientation of the magnets embedded in human interface device 104.

In FIG. 2A, sensing device 103 is illustrated in the form of a mat, a pad or other structure upon which human interface device 104 may be positioned (the dashed line to the top left of the drawing indicates that the structure may continue on beyond that which is explicitly illustrated) directly on or near. However, sensing device 103 may be implemented with other types of structures.

Figure 2D:
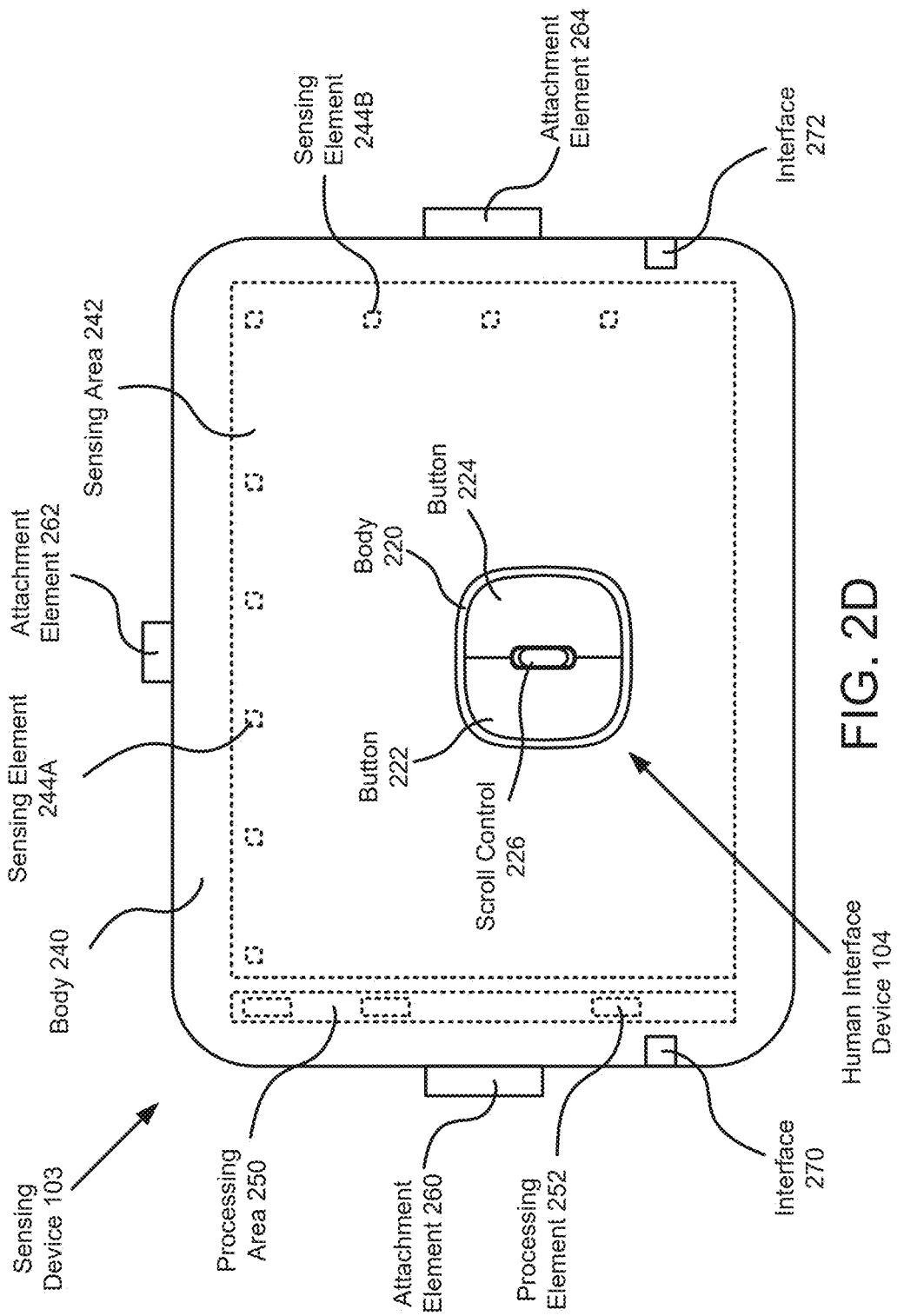
Figure 2F:
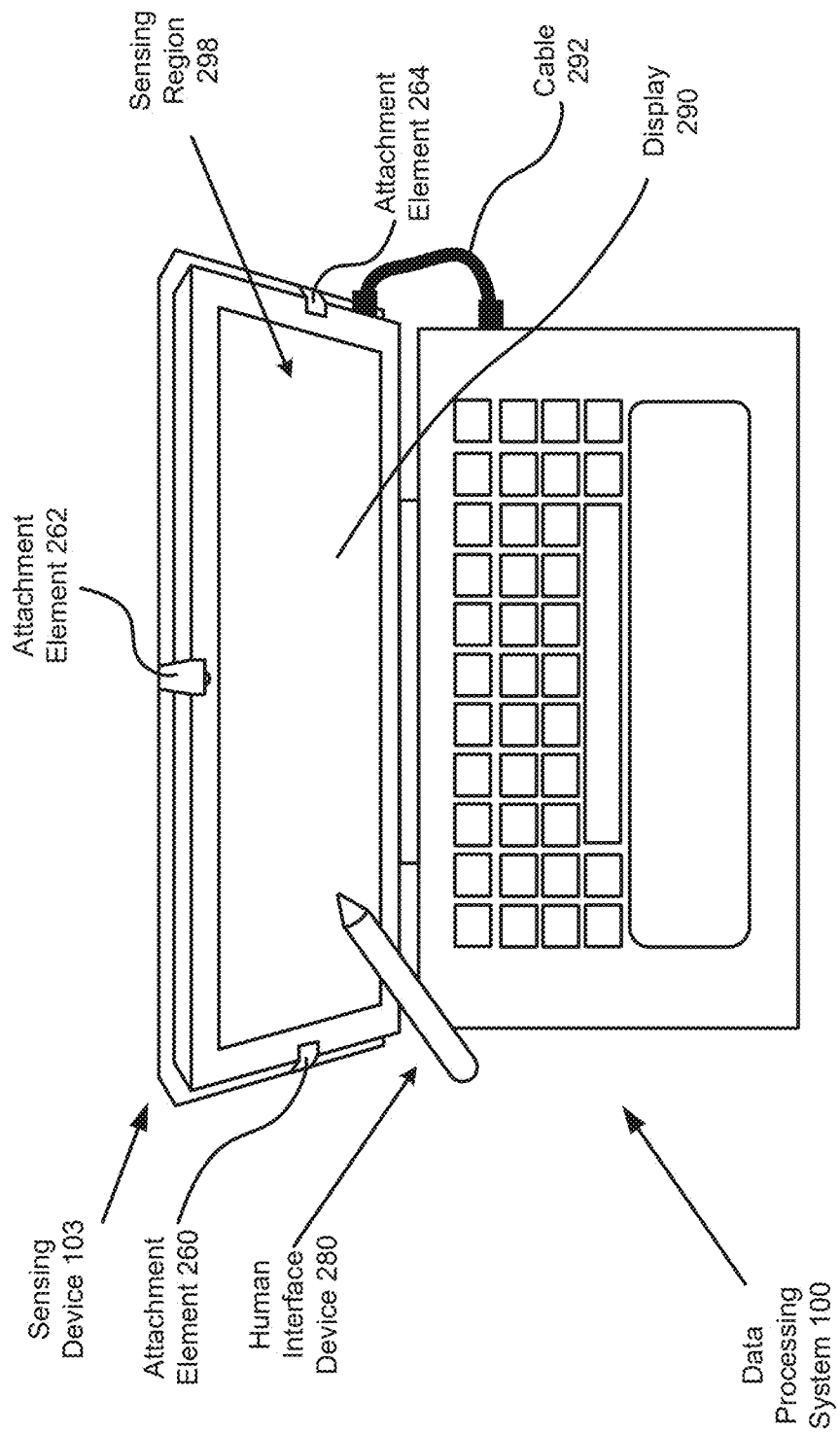

Additionally, while the sensing elements are illustrated with example positions, it will be appreciated that the sensing elements may be positioned differently without departing from embodiments disclosed herein. Refer to FIGS. 2D-2F for additional details regarding sensing system 102.

Turning to FIGS. 2B-2C, diagrams illustrating a magnet (e.g., 230) and sensing element 202 in accordance with an embodiment are shown. As noted above, human interface device 104 may include a magnet (e.g., 230). The magnet may project a static magnetic field distribution which may extend outside of the human interface device. In these figures, the magnetic field is illustrated using lines with arrows superimposed over the midpoints of the lines. The direction of the arrow indicates an orientation of the field.

As seen in FIG. 2B, when the magnet is proximate (e.g., within a predetermined distance range, which may vary depending on the strength of the magnet and a sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of the magnet, the magnitude and orientation of the magnetic field at the location of sensing element 202 may be usable to identify, in part, the location and orientation of the magnetic.

For example, when magnet 230 is rotated as shown in FIG. 2C from the orientation as shown in FIG. 2B, the direction and/or magnitude of the magnetic field at the location of sensing element 202 may change. By identifying the magnitude and orientation of the magnetic field at a number of locations (e.g., corresponding to different sensing elements), the position and orientation of magnet 230 may be identified. This may allow for rotation and/or translation of the human interface device to be identified, and which may be caused by the user.

Although one individual magnet (e.g., magnet 230) is depicted in FIGS. 2B-2C, it is to be understood that multiple magnets may be included in a human interface device. For example, human interface device 104 may include a pair of magnets that emanate a magnetic field distribution which may be sensed and used to identify the position/orientation of the magnets.

Additionally, while illustrated as being isolated, it will be appreciated that other structures may be positioned near and/or between magnet 230 and sensing element 202. For example, as will be discussed below, portions of a sensing system may be positioned on backsides of display or other structures while human interface devices may be positioned on the opposite side. The magnetic field may extend through the display or other structures and be measurable by sensing elements positioned on the opposite side. Thus, the sensing system disclosed herein may be widely appliable to a wide range of use cases.

Turning to FIGS. 2D-2F, diagrams showing views of a sensing system and/or human interface device in accordance with an embodiment are shown. FIGS. 2D and 2E show top view diagrams, while FIG. 2F shows an isometric view along with an example data processing system.

Turning to FIG. 2D, a first top view diagram showing sensing device 103 and an example human interface device in accordance with an embodiment is shown. To provide its functionality, sensing device 103 may include body 240, sensing area 242, processing area 250, attachment elements (e.g., 260-264), and interfaces (e.g., 270-272). Each of these components is discussed below.

Body 240 may be a structure that physically attached other components of sensing device 103. For example, body 240 may include a sheet of material. The sheet of material may be stiff or rollable. For example, the sheet of material may be a stiff plastic or may be a rubber material. The sheet of material may have a width (e.g., shown left-right in the page) and height (e.g., shown top-bottom in the page) that are larger than a thickness (e.g., into the page) of body 240).

Generally, body 240 may have a width and height that enables human interface devices to move across it and/or with respect to it. For example, as seen in FIG. 2D, the width/height of body 240 may be larger than similar dimensions of human interface device 104.

To track the position, orientation, and actuations of human interface device, body 240 may include sensing area 242. Sensing area 242 may be a portion of body 240 in which sensing elements (e.g., 244A-244B) are positioned. In FIG. 2D, the number and type of sensing elements are shown with specific numbers and positions, but it will be appreciated that different numbers and/or positions of sensing elements may be utilized without departing from embodiments disclosed herein.

In addition to sensing elements 244A-244B, various wiring harnesses and/or other electrical components (not shown) may be included in sensing area 242 to enable sensing elements 244A-244B to be powered, controlled, and facilitate collection of information regarding sensed magnetic field distributions.

Sensing elements 244A-244B may include any number of such elements and may be distributed in any manner. Any of sensing elements 244A-244B may be similar to the sensing elements discussed with respect to FIGS. 2A-2C. In FIG. 2D, sensing area 242, sensing elements 244A-244B, processing area 250, and processing element 252 are drawn in dashing to indicate that they may be within body 240 and would otherwise be obscured by the viewpoint of FIG. 2D.

Processing area 250 may be a portion of body 240 in which processing elements (e.g., 252) are positioned. In FIG. 2D, the number and type of processing elements are shown with specific numbers and positions, but it will be appreciated that different numbers and/or positions of processing elements may be utilized without departing from embodiments disclosed herein. The processing elements may include, for example, digital signal processors, general digital processors, signal amplifiers, and/or other types of electronic components usable to process information collected by sensing elements 244A-244B and/or perform other types of functions.

Any of the processing elements may be operably connected to any of the sensing elements (e.g., 244A-244N) to facilitate control, powering, and/or data collection. Likewise, any of the processing elements may be operably connected to any of the interfaces to facilitate control (e.g., by and/or of data processing systems), powering, and/or communication.

Interfaces 270, 272 may be wired and/or wired interfaces for establishing operable connections between data processing systems and portions of sensing device 103. For example, interfaces 270-272 may be implemented using universal serial bus interfaces which may enable both power and data to be transmitted between sensing device 103 and a data processing system. In the event that interfaces 270, 272 are wireless, sensing device 103 may include a power connector usable to operably connect the active components of sensing device 103 to a power supply. The power connection may be wired or wireless.

To facilitate cooperation, any of the processing elements (e.g., 252) may operate as a controller for sensing device 103. The controller may activate various functions of other components of sensing device 103 using control lines and/or other communication/control modalities.

Generally, body 240 may be adapted to be positioned on a surface so that various human interface devices may be positioned with it. For example, as shown in FIG. 2D, a mouse-type human interface device is shown as being positioned on a top surface of body 240. However, it will be appreciated that other types of human interface devices may be utilized.

For example, turning to FIG. 2E, a second top view diagram of sensing device 103 in accordance with an embodiment is shown. As seen in FIG. 2E, a stylus type of human interface device 280 may also be used with sensing device 103. For example, human interface device 280 may include button 281, pointing end 282, and at least on magnet. The magnet may, like human interface device 104, generate a magnetic field distribution measurable by sensing elements 244A-244B. The magnet(s) may also be mechanically coupled to button 281 so that actuations of button 281 move the magnet(s). Consequently, changes in position, orientation, and actuations of human interface device 280 may all cause the magnetic field distribution exhibited by human interface device 280 to change (e.g., information regarding these characteristics of human interface device 280 may be encoded in the magnetic field distribution.

In FIG. 2E, sensing device 103 is illustrated in an example position on a surface such as a table. However, sensing device 103 may be positioned in other places. For example, sensing device 103 may be reversibly secured to a data processing system. When so secured, sensing device 103 may still be able to sense human interface devices positioned with it.

For example, returning to the discussion of FIG. 2D, to reversibly secure body 240 to a data processing system, any number of attachment elements (e.g., 260, 262, 264) may be positioned with body 240. The attachment elements may include ears, flaps, hooks, and/or other types of structures that enable corresponding portions of body 240 to be reversibly secured to a portion of a data processing system.

Turning to FIG. 2F, an isometric front view of data processing system 100 in accordance with an embodiment is shown. As seen in FIG. 2F, data processing system 100 may be implemented using a laptop computer, a 2 in 1 computer, a tablet computer, or another type of computer that may include a display (e.g., 290). To enable use of human interface device 280 in conjunction with display 290, human interface device 280 may be positioned behind display 290 and fixedly attached to it using attachment elements 260, 262, 264.

When so positioned, the sensing region (e.g., 298) of sensing device 103 may extend through and to a volume in front of display 290. Consequently, the user may position human interface device 280 next to the display and provide user input. However, rather than the user input being received via display 290, the user input may be obtained via sensing device 103 and may be correlated with the content displayed on display 290 at the time. Accordingly, the intent of the user may be interpreted by the activity of human interface device 280 and may be used to provide desired computer implemented services.

For example, a user may position human interface device 280 next to a portion of display 290 showing an image. To change a color of the image, the user may actuate a button on human interface device 280. When so actuated, sensing device 103 may sense the position, orientation, and actuation, and generate a control signal reflecting the sensed information.

The sensed information may then be provided to data processing system by, for example, communicating via cable 292 (e.g., a universal serial bus cable that enables information exchange and powering of sensing device 103 by data processing system 100). The sensed information may be correlated with the displayed content to enable the data processing system to identify that the user has provided user input indicating that the image is to be changed color. For example, actuating the human interface device 280 may, in a particular computer program, cause available colors to be cycled. The position/orientation of the human interface device 280 may indicate, in the program, which portion of an image is to have the color cycled. The user may position with the displayed portion of an image and the control signal from sensing device 103 may be used to identify which portion of the display and corresponding portion of the image a pointed end 282 of human interface device 280 is pointed toward. Thus, the interest of the user may be identified through the sensing by sensing device 103, as well as corresponding commands that a user may be attempting to invoke using human interface device 280.

While described with respect to an example usage scenario, it will be appreciated that sensing device 103 may be used to obtain user input used in other computer implemented processes provided by data processing systems without departing from embodiments disclosed herein.

While FIGS. 2A-2F have been illustrated as including specific numbers and types of components, it will be appreciated that any of the devices depicted therein may include fewer, additional, and/or different components without departing from embodiments disclosed herein.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, an orientation and/or position of a human interface device, or portions thereof, is monitored. The orientation and/or position may be monitored by (i) obtaining measurements of a magnetic field distribution emanating (e.g., outside of the human interface device) from at least one magnet positioned in the human interface device, and (ii) computing the orientation and/or position based on the measurement.

For example, a rotational angle and displacement distance may be calculated. The displacement distance may be a distance that a cap of the human interface device is depressed. The rotational angle may be an angle of the cap with respect to a sensing system used to obtain the measurement of the magnetic field distribution.

To obtain the measurements of the field distribution, sensing element of a sensing device may send individual measurements reflecting a field strength and/or orientation at a location of the sensing element. Any number of such sensing elements may be positioned within a body of a sensing device.

Once obtained, the position and/or orientation of the human interface device may be identified by (i) identifying a type of the human interface device, (ii) identifying a position of the sensing device (e.g., with respect to a data processing system), and (iii) matching the samples of the field distribution to known field distributions for known positions of the type of the human interface with respect to the sensing device in the identified position (and/or performing other types of algorithms to identify the human interface device).

The type of the human interface device may be, for example, reported by a user of the data processing system, by identifying unique characteristics of the field distribution (e.g., different human interface devices may generate different field distributions), and/or via other methods.

The position of the sensing device may be identified, for example, by receiving a report from a user of the data processing system, by obtaining other types of sensing information (e.g., the sensing device may include sensors that enable it to identify whether it is positioned with a monitor of a data processing system or on another surface, and/or via other methods.

Once identified, the type of human interface device and position of the sensing device may be used to narrow the potential positions/orientations of the human interface device based on the measured field distribution. For example, different human interface devices may generate different field distributions and different positions of the sensing device may impact the generated field distributions. By removing these variables, the position and/or orientation of the human interface may be identified more easily. For example, an analytical model of the field distribution as a function of different positions/orientations of the human interface may be compared to the sampled field distribution. Any type of matching algorithm (e.g., global/local/etc. optimization with an objective function) may be used to identify the position/orientation of the human interface device.

At operation 302, a command is identified based on the orientation and/or position of the human interface device and/or sensing device.

The command may be identified, for example, by comparing the position and/or orientation to a past position and/or orientation. For example, a change in displacement distance may indicate that a portion of the human interface device has been actuated. Likewise, the change in orientation may indicate that a user rotated the human interface device.

These relative changes may be associated with different types of operations. For example, changes in rotation may indicate that a rotation function of a computer program is being activated, and depression/release of an actuatable feature (e.g., a button) may indicate that a particular function is to be engaged or disengaged. The specific functions may depend on the program being run on a data processing system connected to a sensing system monitoring the human interface device while the changes to the human interface device are sensed.

At operation 304, the command is performed. The command may be performed, for example, by an operating system passing through or otherwise providing information regarding the command to an application or other consumer of the user input. The consumer of the command may then take action based on the command.

The method may end following operation 304.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits.

Figure 4:
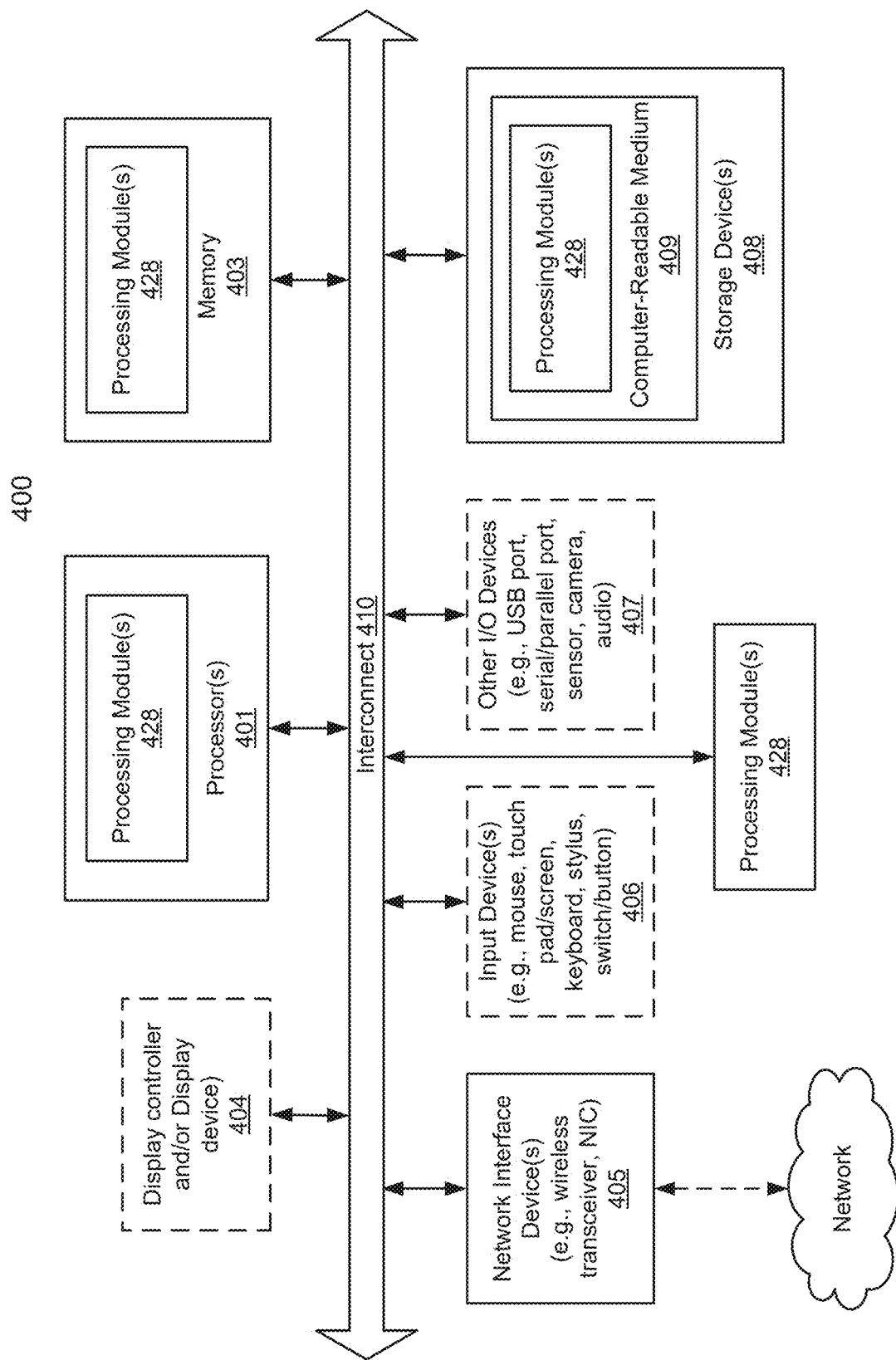
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A sensing device for use with a passive human interface device, the sensing device comprising:
   a body comprising a top surface adapted for positioning with the passive human interface device;
   a sensing area adapted to sense a magnetic field distribution generated by and emanating outside of the passive human interface device while the passive human interface device is positioned in each position from a list of positions comprising:
      on the top surface, and
      on a first side of a display while the sensing area is positioned on a second side of the display, the first side being opposite to the second side;
   a processing area adapted to generate a control signal based on the magnetic field distribution to convey user input provided by a user of the passive human interface device to a data processing system; and
   at least one attachment element adapted to reversibly attach the body to another device.

2. The sensing device of claim 1, further comprising:
   at least one sensing element that is:
      positioned with the sensing area, and
      adapted to sense a magnitude and/or orientation of the magnetic field distribution at a location of the at least one sensing element.

3. The sensing device of claim 2, further comprising:
   a signal processing chain that is:
      positioned with the processing area; and
      adapted to:
         obtain the magnitude and/or orientation of the magnetic field distribution at the location from the at least one sensing element as a first sample of samplings of the magnetic field distribution; and
         generate the control signal based on at least the magnitude and/or orientation of the magnetic field distribution at the location.

4. The sensing device of claim 3, wherein the at least one sensing element comprises a first sensing element and a second sensing element, and the control signal is based on the first sample and a second sample of the samplings obtained from the second sensing element.

5. The sensing device of claim 1, further comprising:
   an interface adapted to place the sensing device in operable communication with the data processing system and use the control signal to convey the user input to a data processing system while the data processing system is operably connected to the sensing device via the interface.

6. The sensing device of claim 1, wherein the at least one attachment element comprises:
   a first attachment element positioned on a first edge of the body; and
   a second attachment element positioned on a second edge of the body.

7. The sensing device of claim 6, wherein the other device is a data processing system comprising the display.

8. The sensing device of claim 1, wherein the body has a width that is greater than a width of the display, and the body has a height that is greater than a height of the display.

9. The sensing device of claim 1, wherein the processing area assumes that at least a portion of the magnetic field distribution is due to a permanent magnet embedded in the passive human interface device, and changes in the magnetic field distribution are due to actuations of the passive human interface device that change a position and/or orientation of the permanent magnet.

10. The sensing device of claim 1, wherein the other device is a data processing system comprising the display.

11. A sensing system, comprising:
    a passive human interface device; and
    a sensing device comprising:
       a body comprising a top surface adapted for positioning with the passive human interface device;
       a sensing area adapted to sense a magnetic field distribution generated by and emanating outside of the passive human interface device while the passive human interface device is positioned in each position from a list of positions comprising:
          on the top surface, and
          on a first side of a display of while the sensing area positioned on a second side of the display, the first side being opposite to the second side;
       a processing area adapted to generate a control signal based on the magnetic field distribution to convey user input provided by a user of the passive human interface device to a data processing system; and
       at least one attachment element adapted to reversibly attach the body to another device.

12. The sensing system of claim 11, further comprising:
    at least one sensing element that is:
       positioned with the sensing area, and
       adapted to sense a magnitude and/or orientation of the magnetic field distribution at a location of the at least one sensing element.

13. The sensing system of claim 12, further comprising:
    a signal processing chain that is:
       positioned with the processing area; and
       adapted to:
          obtain the magnitude and/or orientation of the magnetic field distribution at the location from the at least one sensing element as a first sample of samplings of the magnetic field distribution; and
          generate the control signal based on at least the magnitude and/or orientation of the magnetic field distribution at the location.

14. The sensing system of claim 13, wherein the at least one sensing element comprises a first sensing element and a second sensing element, and the control signal is based on the first sample and a second sample of the samplings obtained from the second sensing element.

15. The sensing system of claim 11, further comprising:
an interface adapted to place the sensing device in operable communication with the data processing system and use the control signal to convey the user input to a data processing system while the data processing system is operably connected to the sensing device via the interface.

16. The sensing system of claim 11, wherein the at least one attachment element comprises:
a first attachment element positioned on a first edge of the body; and
a second attachment element positioned on a second edge of the body.

17. The sensing system of claim 16, wherein the other device is a data processing system comprising the display.

18. The sensing system of claim 11, wherein the body has a width that is greater than a width of the display, and the body has a height that is greater than a height of the display.

19. The sensing system of claim 11, wherein the processing area assumes that at least a portion of the magnetic field distribution is due to a permanent magnet embedded in the passive human interface device, and changes in the magnetic field distribution are due to actuations of the passive human interface device that change a position and/or orientation of the permanent magnet.

20. The sensing system of claim 11, wherein the other device is a data processing system comprising the display.

\* \* \* \* \*